US012810249B1

(12) United States Patent
Stanford et al.

(10) Patent No.: US 12,810,249 B1

(45) Date of Patent: *Nov. 24, 2026

(54) RFID SYSTEMS WITH SESSION-DEPENDENT REPLIES

(71) Applicant: Impinj, Inc., Seattle, WA (US)

(72) Inventors: Theron Stanford, Seattle, WA (US); Alberto Pesavento, Seattle, WA (US); Vadim Lobanov, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/341,899

(22) Filed: Sep. 26, 2025

Related U.S. Application Data

(63) Continuation of application No. 18/098,866, filed on Jan. 19, 2023, now Pat. No. 12,430,611, which is a continuation of application No. 17/134,647, filed on Dec. 28, 2020, now Pat. No. 11,562,322, which is a continuation of application No. 16/121,673, filed on Sep. 5, 2018, now Pat. No. 10,878,371.

(60) Provisional application No. 62/554,657, filed on Sep. 6, 2017, provisional application No. 62/554,986, filed on Sep. 6, 2017.

(51) Int. Cl.
*G06Q 10/087* (2023.01)
*G06K 7/10* (2006.01)
*G06K 19/077* (2006.01)

(52) U.S. Cl.
CPC ....... *G06Q 10/087* (2013.01); *G06K 7/10366* (2013.01); *G06K 19/07773* (2013.01)

(58) Field of Classification Search
CPC ..................... G06K 7/10366; G06K 19/07773
See application file for complete search history.

(56) References Cited

U.S. PATENT DOCUMENTS 10,878,371 B1 * 12/2020 Stanford ............ G06K 7/10366
11,562,322 B1 * 1/2023 Stanford .......... G06K 19/07773
12,430,611 B1 * 9/2025 Stanford ............ G06K 7/10366

* cited by examiner

*Primary Examiner* — Christle I Marshall
(74) *Attorney, Agent, or Firm* — Turk IP Law, LLC

(57) ABSTRACT

RFID systems may be configured to use session-dependent replies. When an RFID tag is involved in a certain inventorying session, the tag may respond to inventorying commands with a reply that is at least partly generated based on the session. For example, the tag may generate a reply with a string that has parity based on the session or includes an identifier for the session. The string may be a random number, a tag identifier or item identifier, or any other suitable data sent from the tag.

20 Claims, 8 Drawing Sheets

300

*RFID SYSTEM COMMUNICATION*

RFID SYSTEMS WITH SESSION-DEPENDENT REPLIES

CROSS REFERENCE TO RELATED APPLICATIONS

This application is a continuation of U.S. application Ser. No. 18/098,866, filed Jan. 19, 2023, which is a continuation of U.S. application Ser. No. 17/134,647, filed Dec. 28, 2020, now U.S. Pat. No. 11,562,322, which is a continuation of U.S. application Ser. No. 16/121,673, filed Sep. 5, 2018, now U.S. Pat. No. 10,878,371, which claims the benefit of U.S. Provisional Patent Applications Ser. Nos. 62/554,657 and 62/554,986, both filed on Sep. 6, 2017. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID systems that use session-dependent replies. When an RFID tag is involved in a certain inventorying session, the tag may respond to inventorying commands with a reply that is at least partly generated based on the identity of the inventorying session. For example, the tag may generate a reply with a string that has parity based on the session or includes an identifier for the session. The string may be a random number, a tag identifier or item identifier, or any other suitable data sent from the tag.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

Figure 1:
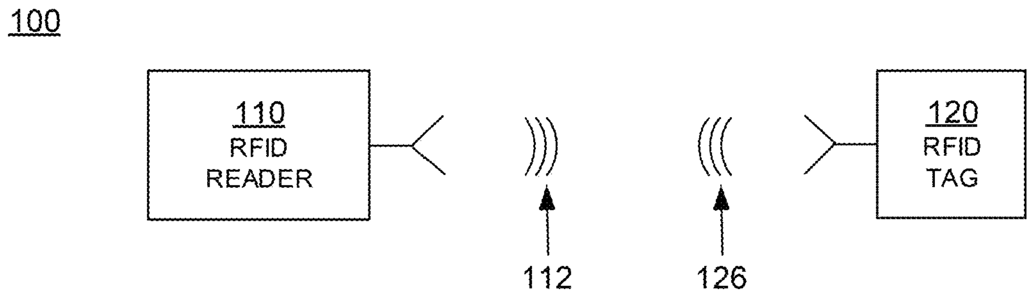
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

In some RFID systems, a reader and tag communicate using an inventorying process. According to one example inventorying process, such as the one described in the Gen2 Specification, a reader transmits a query command (e.g., a Gen2 Query, QueryAdj, or QueryRep command) that instructs tags that meet certain criteria to respond. Upon receiving the command, a tag that meets the criteria responds with a random or pseudorandom number. The reader, upon receiving the tag response, transmits an acknowledgement command incorporating the random/pseudorandom number. When the tag receives the acknowledgement command and determines that the incorporated number is identical to the number it previously sent, the tag responds with additional information, such as a tag or item identifier, or any other suitable information.

The Gen2 Specification provides multiple inventorying sessions to allow multiple readers to independently inventory a common tag population. When transmitting a query command, a reader can specify a particular inventory session and optionally a particular session flag value. Tags that have the appropriate session flag value for the specified inventory session may then respond.

In situations where multiple readers are inventorying in multiple sessions, a reader inventorying in a first session may receive a random number sent by a tag being inventoried in a second, different session. The reader may then mistakenly attempt to inventory the tag, which can be problematic. In some embodiments, such mistaken inventorying attempts can be addressed using session-dependent replies.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generates signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
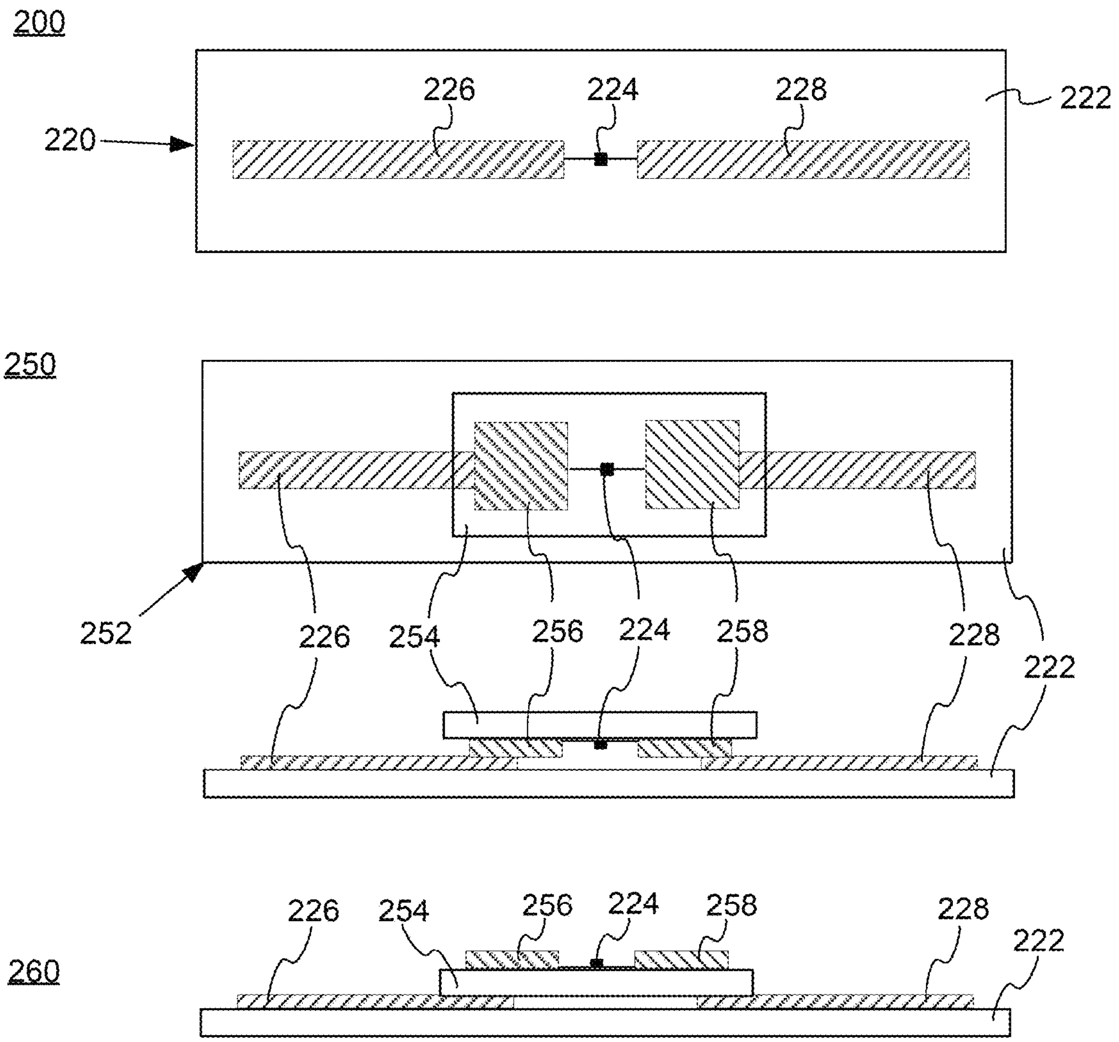
FIG. 2 is a diagram showing components of a passive RFID tag, such as a tag that can be used in the system of FIG. 1.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. An "RFID IC" may refer to an item capable of receiving and responding to RFID signals. For example, an item having a separate but attached RFID tag can be considered an RFID IC, as is an item having an integrated RFID tag or an item manufactured to have the capabilities of an RFID tag. A standalone RFID tag may also be referred to as an "RFID IC".

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

Figure 3:
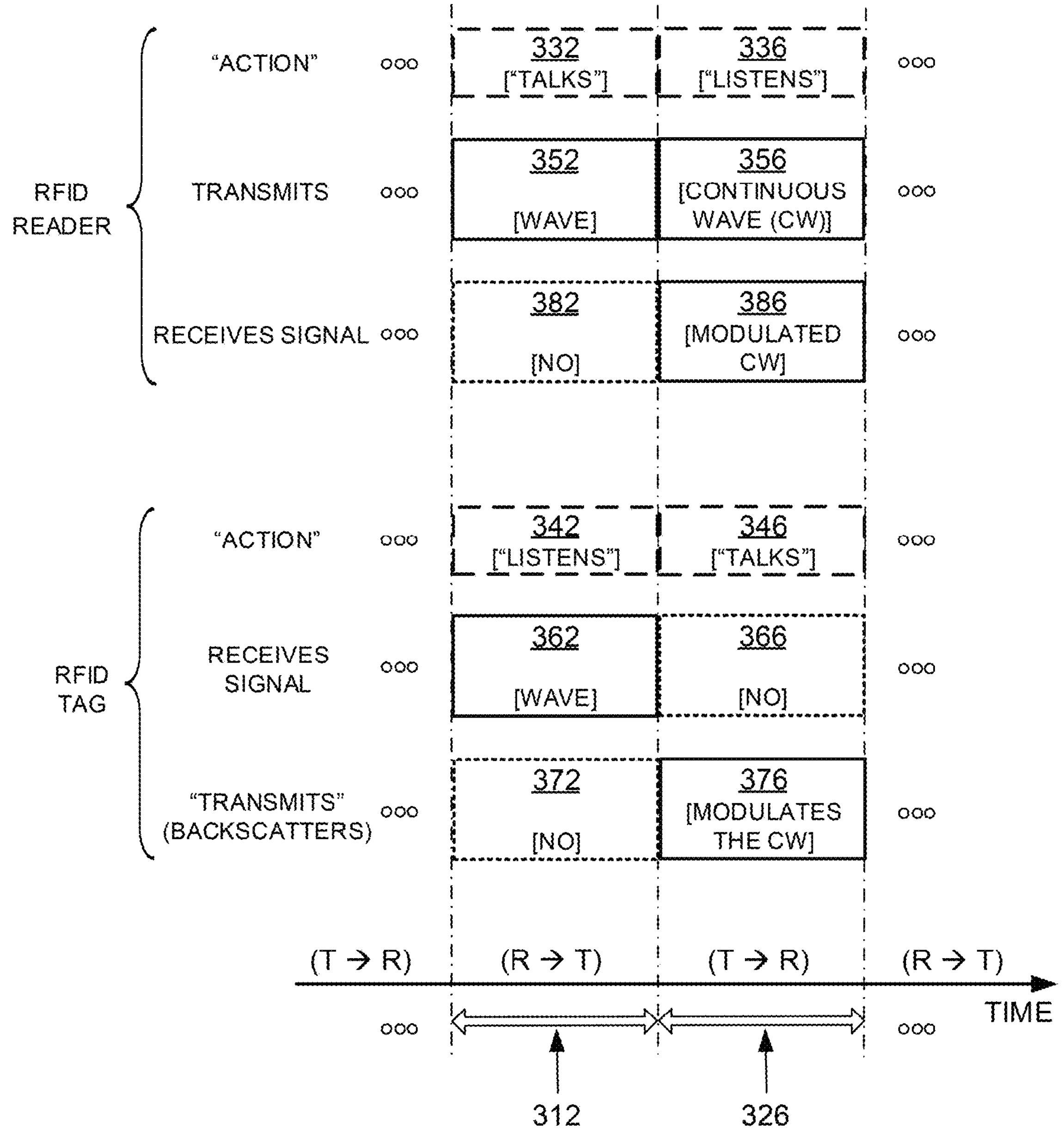
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may typically be of a different duration than interval 326-here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, which may also be referred to as a backscatter time interval or backscatter interval, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126, for example by adjusting its antenna reflectance. Concurrently, according to block 386, reader 110 receives backscatter signal 126 and processes it.

Figure 4:
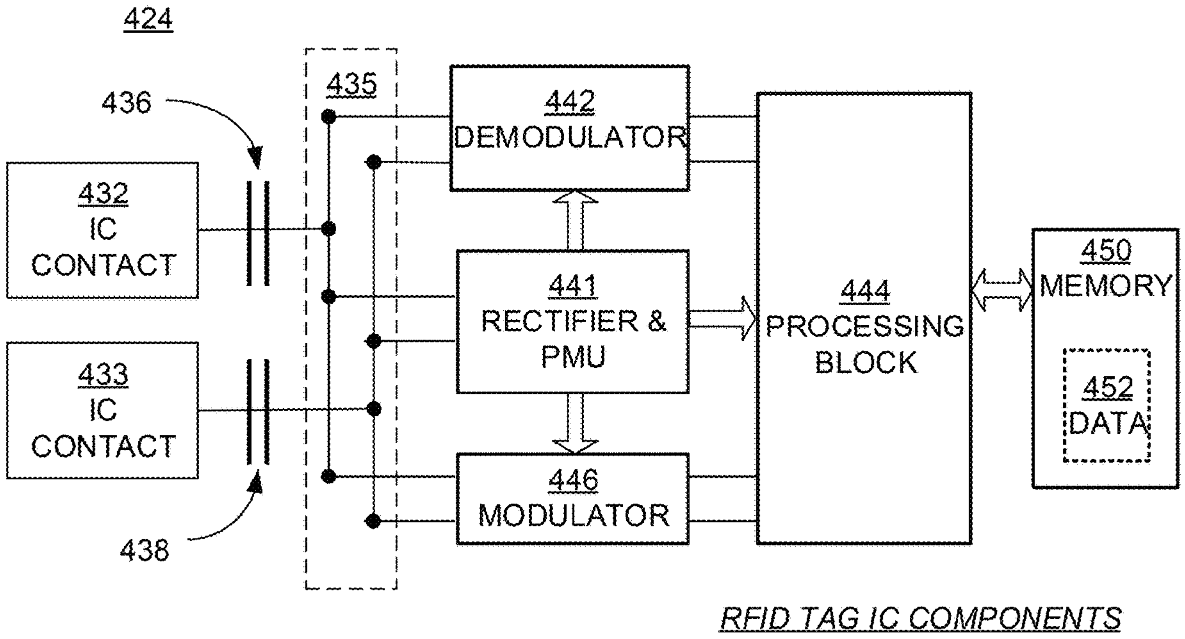
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art, and may include one or more components configured to convert an alternating-current (AC) or time-varying signal into a direct-current (DC) or substantially time-invariant signal.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a nonvolatile memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
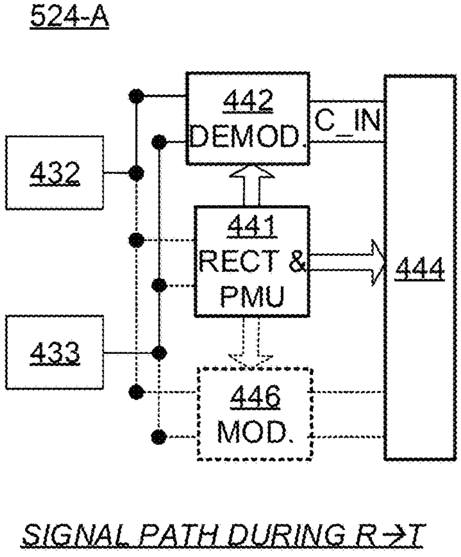
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
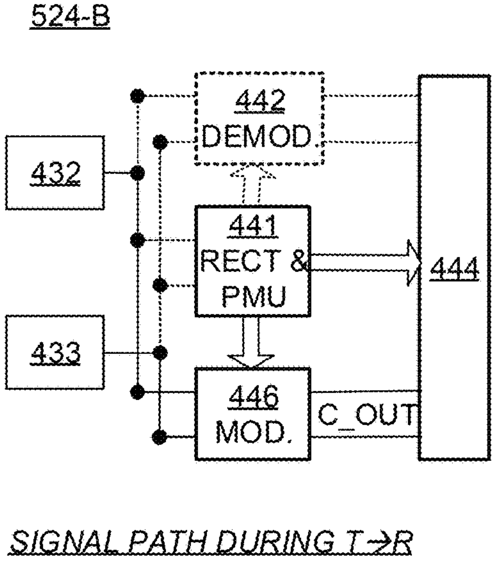

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
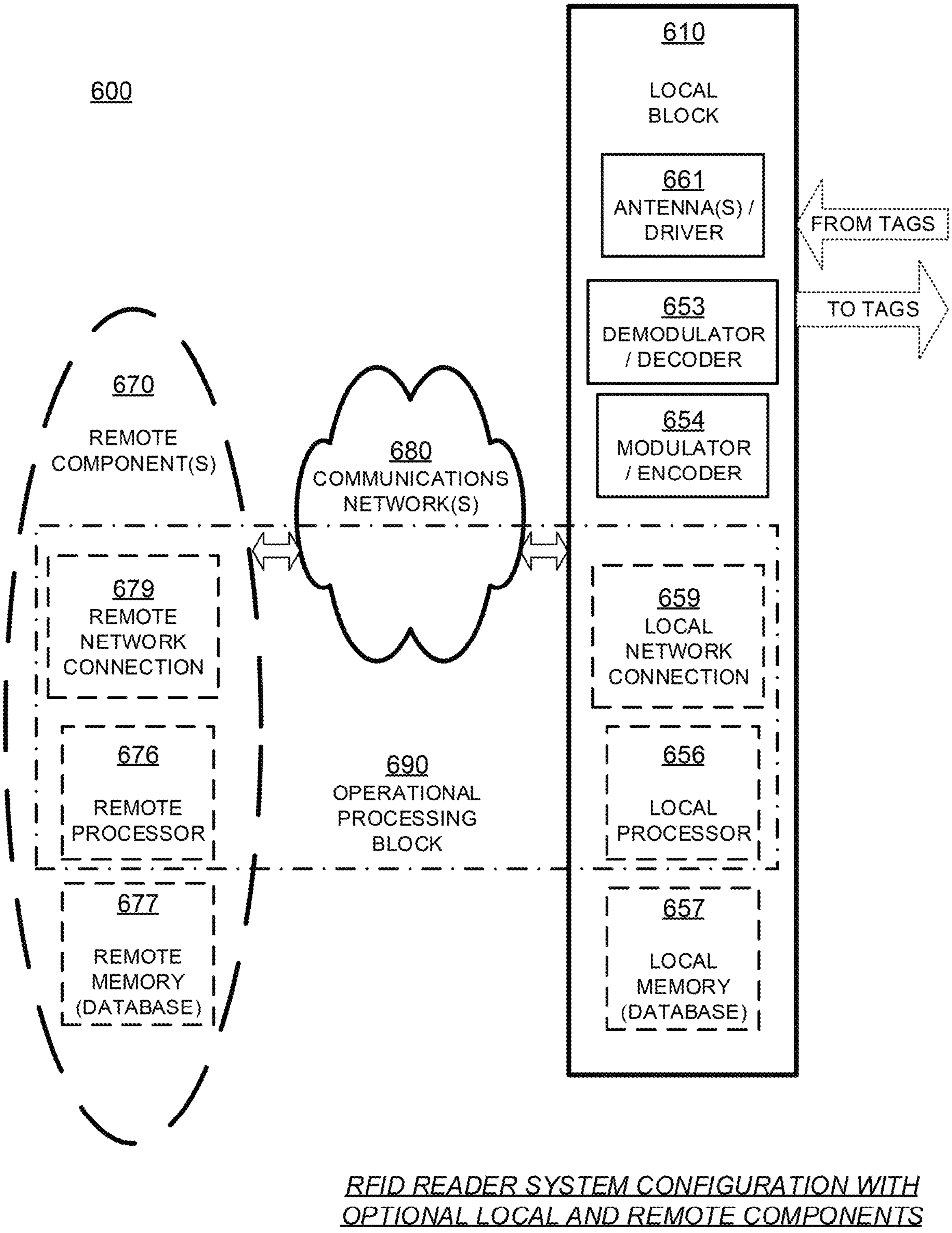
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. For example, local block 610 or portions of local block 610 may be implemented as a standalone device or as a component in another device. In some embodiments, local block 610 or portions of local block 610 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with RFID tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 651 may be a phased-array antenna or synthesized-beam antenna (SBA), and local block 610 may be implemented in a synthesized-beam reader (SBR) configured to generate one or more beams via the SBA. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases, local processor 656 may implement an encryption or authentication function; in some cases, one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, encryption/authentication algorithms, algorithms for tracking tag location or movement, secret keys, key pairs, individual public and/or private keys, electronic signatures, and so on. In some of these embodiments, local memory 657 is provided as a database.

Some components of local block 610 typically treat the data as analog, such as the antenna/driver block 651. Other components such as local memory 657 typically treat the data as digital. At some point, there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680 or may couple to a separate device or component configured to communicate with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They may communicate with each other and local block 610 via communications network 680, or via other similar networks, and so on. Accordingly, remote component(s) 670 can use respective remote network connections. Only one such remote network connection 679 is shown, which is similar to local network connection 659, etc. In some embodiments, a single one of the remote component(s) 670 may be configured to communicate with and/or control multiple local blocks, each similar to local block 610.

Remote component(s) 670 can also include a remote processor 676. Remote processor 676 can be made in any way known in the art, such as was described with reference to local processor 656. Remote processor 676 may also implement an encryption/authentication function and/or a tag location/tracking function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

One or more of the above-described elements may be combined and designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. Such a system may be subdivided into components or modules. Some of these components or modules can be implemented as hardware, some as software, some as firmware, and some as a combination. An example of such a subdivision is now described, together with the RFID tag as an additional module.

Figure 7:
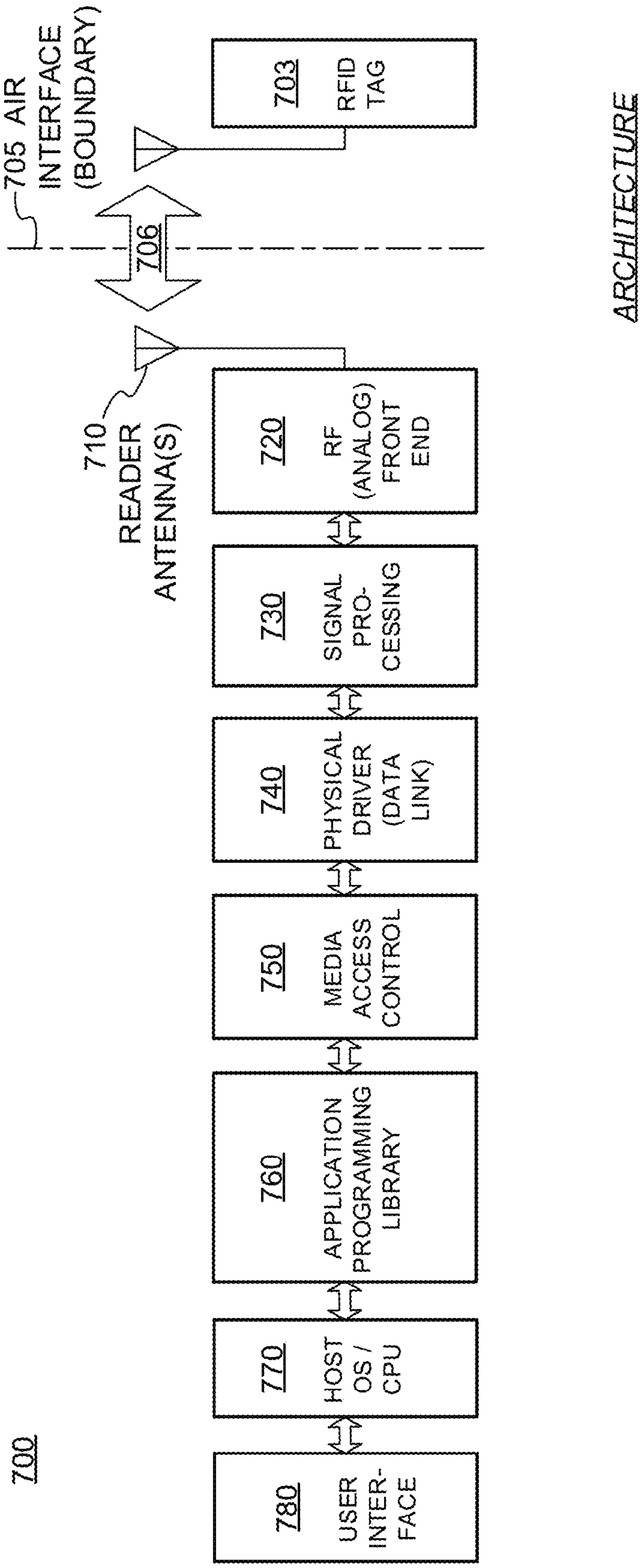
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 further includes a physical-driver module 740, which is also known as a data-link module. In some embodiments, physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments, the one or more processors may perform operations associated with retrieving data that may include a tag public key, an electronic signature, a tag identifier, an item identifier, and/or a signing-authority public key. In some embodiments, the one or more processors may verify an electronic signature, create a tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them. In some embodiments RFID system 700 can be incorporated into another electronic device such as a checkout terminal in a store or a consumer device such as a mobile phone.

Figure 8:
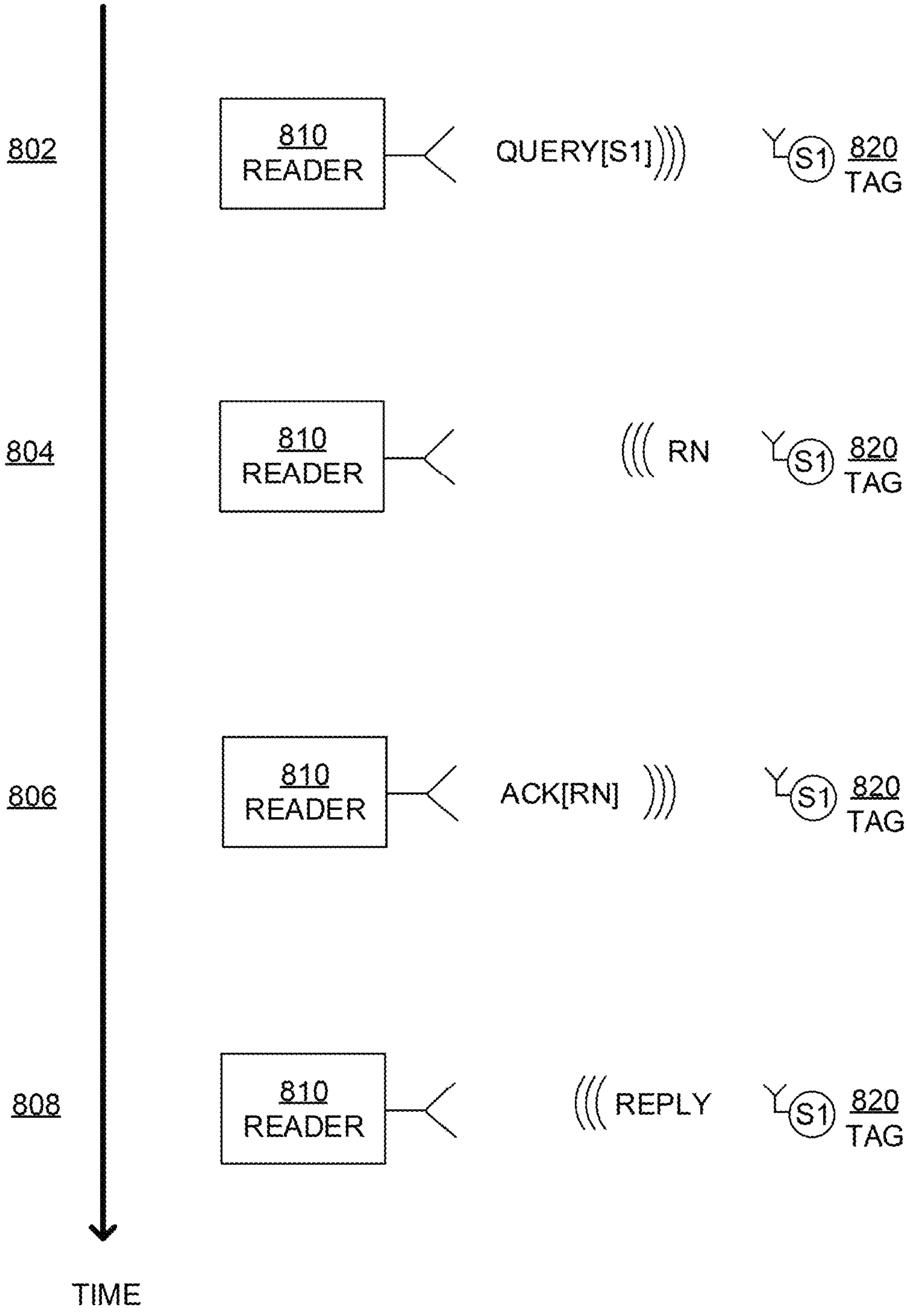
FIG. 8 depicts a portion of a tag inventorying process.

RFID readers and tags can communicate using an inventorying process that involves the exchange of information. FIG. 8 depicts a portion of a tag inventorying process. At time 802, reader 810 transmits a query command (e.g., one of the Query/QueryRep/QueryAdj commands as described in the Gen2 Specification) that specifies a particular session flag value for session S1, or specifies the session S1. Tag 820, which happens to have the appropriate session flag value for session S1, receives the query command, and at time 804 responds to the query command with a random (or pseudorandom) number RN. Reader 810 receives the RN, and at time 806 transmits an acknowledge command (e.g., the ACK command as described in the Gen2 Specification) containing the received RN. Tag 820 receives the acknowledge command containing the RN, and upon confirming that the received RN corresponds to the previously-sent RN, sends a reply to reader 810 at time 808. Subsequently, reader 810 and tag 820 may continue the communication as appropriate.

Figure 9:
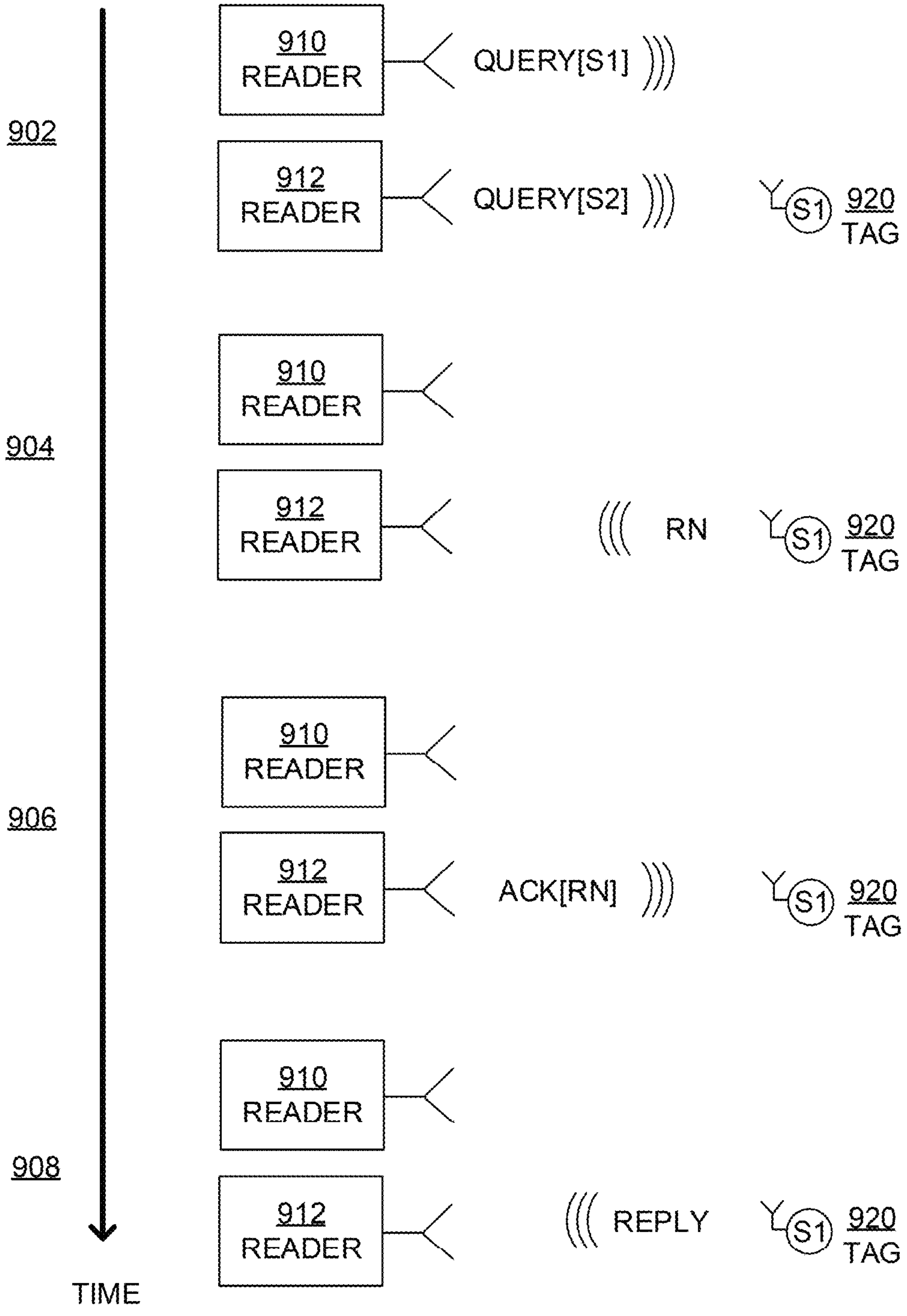
FIG. 9 depicts how a reader may acknowledge a tag responding to a different reader.

However, in some circumstances a reader inventorying in a first session may overhear an RN that is part of an inventorying process in a second session and co-opt the inventorying process. FIG. 9 depicts how a reader may acknowledge a tag responding to a different reader. At time 902, reader 910 transmits a query command that specifies session S1 or a particular session flag value for session S1. Also at time 902, reader 912 transmits a query command that specifies session S2 or a particular session flag value for session S2.

Tag 920 hears both query commands. However, as tag 920 only has the appropriate session flag value for session S1, at time 904 tag 920 responds to the query command from reader 910 with a random number RN.

Although RN was meant for reader 910, reader 912 may also hear the RN. Reader 912 is also expecting to receive RNs from tags having the appropriate session flag value for session S2, and may determine that the RN sent from tag 920 is an RN from a tag having the appropriate session flag value for session S2. Moreover, reader 910 may not have heard the RN, or may be otherwise delayed and unable to transmit an acknowledge command before reader 912 transmits. Accordingly, at time 906 reader 912 transmits an acknowledge command containing the received RN. Tag 920 receives the acknowledge command from reader 912, and upon confirming that the contained RN corresponds to the previously-sent RN, sends a reply to reader 912 at time 908. As a result, reader 912 has now co-opted the communication between reader 910 and tag 920.

Figure 10:
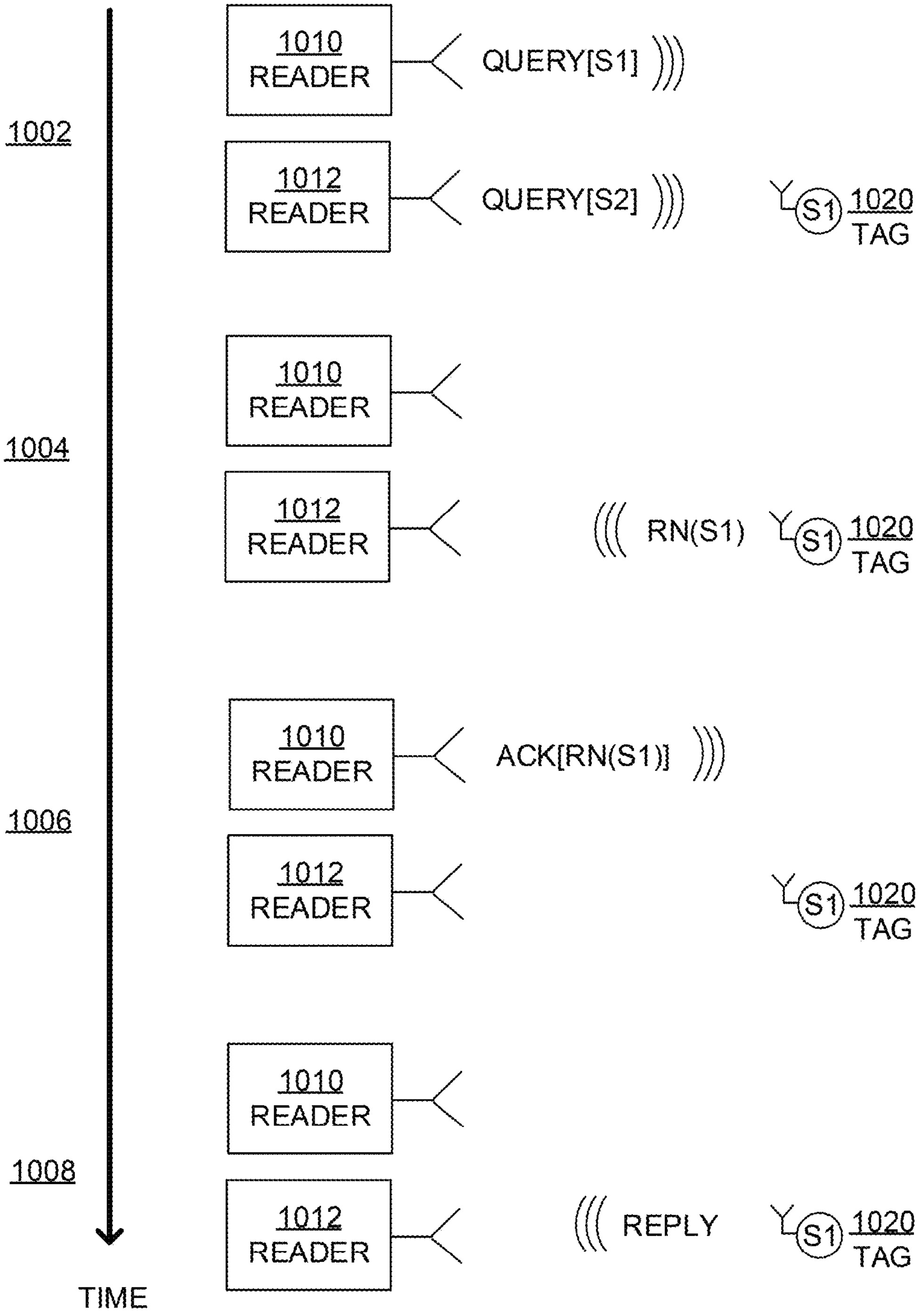
FIG. 10 depicts how inventorying-session-dependent replies can be used to prevent a reader from acknowledging a tag responding to a different reader.

One way to prevent the situation described in FIG. 9 is for tags to respond with session-dependent replies. FIG. 10 depicts how inventorying-session-dependent replies can be used to prevent a reader from acknowledging a tag responding to a different reader. At time 1002, reader 1010 transmits a query command that specifies session S1 or a particular session flag value for session S1. Also at time 1002, reader 1012 transmits a query command that specifies session S2 or a particular session flag value for session S2.

Tag 1020 hears both query commands. However, as tag 1020 only has the appropriate session flag value for session S1, at time 1004 tag 1020 responds to the query command from reader 1010 with a random number generated based on session S1, denoted RN(S1).

Reader 1012 may hear RN(S1) even though it was intended for reader 1010. However, reader 1012 can determine that RN(S1) is meant for session S1, and because it was inventorying in session S2, reader 1012 will ignore RN(S1). As a result, reader 1012 will not co-opt the communication between reader 1010 and tag 1020.

In contrast, reader 1010 will not ignore RN(S1), because reader 1010 was inventorying in session S1. Accordingly, at time 1006 reader 1010 transmits an acknowledge command containing RN(S1). Tag 1020 receives the acknowledge command from reader 1010, and upon confirming that the contained RN(S1) corresponds to the previously-sent RN(S1), sends a reply to reader 1010 at time 1008. Subsequently, reader 1010 and tag 1020 may continue the communication as appropriate.

A tag such as tag 1020 may generate RN(S1) or another such session-dependent string for a session-dependent reply in multiple ways. In some embodiments, the tag first generates a string and then uses an encoding scheme to adjust and impart session-dependency to the string, thereby creating an encoding-adjusted string from the generated string. In other embodiments, the tag may generate the string using an encoding scheme that imparts session-dependency. The tag may generate a string algorithmically (e.g., via the application of one or more algorithms to one or more input values), using a random or pseudorandom number generator, by retrieving the string from tag IC memory, and/or via a combination of two or more techniques. Accordingly, the string may include a random or pseudorandom number (e.g., an RN16 or tag handle according to the Gen2 Specification), a tag or item identifier, a pointer to a remote location, an algorithmically generated value, a cryptographic value (e.g., a value generated during a cryptographic process), content stored in a tag IC memory, or any other suitable string.

The encoding scheme may impart session dependency to a string in any suitable way. In some embodiments, the encoding scheme may use an error-detection or error-correction code to impart session dependency. For example, the encoding scheme may use one or more bits of a string as an error-detection or error-correction code, such as parity bit or bits, a checksum, a cyclic-redundancy-check (CRC), or any other suitable error-detection or error-correction code, to provide session dependency. The encoding scheme may cause one or more bits of a generated string to be adjusted to form the error-detection or error-correction code, or may cause one or more error-detection or error-correction code bits to be added to a generated string. In these embodiments, different code characteristics, such as parity, may represent different sessions. For example, a tag may create parity-adjusted strings such that a string corresponding to an even session (e.g., S0 or S2) has even parity (where the number of "1" values in the string including the error-detection or correction codes is even), whereas a string corresponding to an odd session (e.g., S1 or S3) has odd parity (where the number of "1" values in the string including the error-detection or correction codes is odd). Of course, in other embodiments parity-adjusted strings corresponding to even sessions may have odd parities and parity-adjusted strings corresponding to odd sessions may have even parities.

In other embodiments, the encoding scheme may use one or more session identifier bits to impart session dependency. For example, the encoding scheme may use a bit value of "0" to correspond to an even session (e.g., the Gen2 S0 or S2 sessions), and may use a bit value of "1" to correspond to an odd session (e.g., the Gen2 S1 or S3 sessions), or vice-versa. As another example, the encoding scheme may use bit values of "00" to indicate session S0, "01" to indicate session S1, "10" to indicate session S2, and "11" to indicate session S3. In other embodiments, any session identifier bit values may correspond to any session, as long as a suitably-configured reader knows or can decode the correspondence. The encoding scheme may add the session identifier bits to an already-generated string, or may adjust one or more bits of an already-generated string to serve as session identifier bits.

In some embodiments, the encoding scheme may be selected based on the intended inventory session for the string or reply. For example, the tag may use a first encoding scheme to provide session dependency for a string or reply for a first inventory session, and may use a second encoding scheme to provide session dependency for a string or reply for a second inventory session. A suitably-configured receiving reader may then be able to determine the session dependency of a string or reply based on the encoding scheme.

A tag may be configured to always use session-dependent replies or only use such replies in certain circumstances (e.g., upon receiving a command or upon detecting certain environmental changes). Likewise, an RFID reader or system compatible with session-dependent replies may always use the session dependency of session-dependent replies or may only use the session dependency in certain circumstances. Such circumstances can include received signal strength indication (RSSI) values, the types of tags in a tag population, the capabilities of tags in a tag population, the size of a tag population, or any other suitable factor. For example, an RFID system may use session dependency if detected RSSI values are relatively low or fall below a threshold. As another example, an RFID system may use session dependency if the percentage or number of tags in a tag population that support session-dependent replies exceed or fall below a certain threshold. The RFID system may determine the percentage or number of tags that support session-dependent replies based on active or passive measures. Active measures include sending a command that selects tags that support session-dependent replies, and passive measures include determining whether the bit value distribution of a series of received codes more closely corresponds to a population of tags that support session-dependent replies or a population of tags that do not support session-dependent replies.

If an RFID system does not use session dependency, it treats a session-dependent string as its corresponding, non-session-dependent version. For example, an RFID system can treat a session-dependent random number as a non-session-dependent random number.

In some embodiments, an RFID system may cause suitably-configured tags to enable or disable use of session-dependent replies. In these embodiments, the RFID system may transmit commands that cause receiving and suitably-configured tags to begin and/or stop generating session-dependent replies. For example, a tag that is able to generate session-dependent replies may initially generate session-independent replies. The tag may then begin generating session-dependent replies upon receiving a reader command instructing the tag to do so. In some embodiments, the tag may first authenticate the reader and/or determine whether the reader is authorized before generating session-dependent replies. Subsequently, the tag may stop generating session-dependent replies upon receiving a suitable authenticated or authorized reader command instructing the tag to do so. The RFID system may determine whether to enable or disable use of session-dependent replies based on any suitable circumstances, such as those described above. In some embodiments, the tag may stop generating session-dependent replies upon a timeout, upon generating a limited number of session-dependent replies, or upon receiving another inventorying command. For example, a reader command enabling session-dependent replies may only cause the tag to generate session-dependent replies for a limited time before the tag stops generating session-dependent replies. Thereafter, a suitable reader command may again enable the tag to generate session-dependent replies.

RFID systems may use session dependency in a variety of applications. In one embodiment, an RFID reader system may use session dependency to identify the specific reader that initiated communication with a tag, as described above. This reader identification may be further extended to determine the location of RFID tags. An RFID reader system with readers or reader antennas configured to inventory tags at multiple locations may inventory the locations using different inventorying sessions. For example, the reader system may cause inventorying commands specifying a first session to be transmitted toward a first location via a first reader or reader antenna, while causing inventorying commands specifying a second session to be transmitted toward a second location via a second reader or reader antenna. The system may then use session-dependent replies from a tag to determine whether the tag is likely located at the first or second location. For example, if most of the replies from the tag indicate or are based on the first session, the system may determine that the tag is likely at the first location. If most of the replies from the tag instead indicate or are based on the second session, the system may determine that the tag is likely at the second location.

In some embodiments, the location identification described above may be further extended to tracking tag trajectory (e.g., the speed, direction, and path of a tag in motion). An RFID reader system configured to inventory tags at multiple locations with different inventorying sessions may use determine tag location information (As described above) over time to determine tag trajectory. For example, an RFID reader system configured to track tag movement through neighboring doorways or passageways may inventory the different doorways or passageways using different inventorying sessions. When the system receives session-dependent replies from a tag, the system may determine (a) which doorway or passageway the tag is likely passing through, and (b) the direction with which the tag is passing through the doorway or passageway.

As mentioned previously, embodiments are directed to RFID systems using session-dependent replies. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

According to some examples, a method for an RFID IC coupled to an antenna to operate in one of two inventorying sessions is provided. The method may include receiving an inventorying command specifying one of the inventorying sessions. If the specified session is a first session, the method may include selecting an odd parity. If the specified session is a second session, the method may include selecting an even parity. The method may further include generating a reply to the inventorying command by generating a string for inclusion in the reply and adjusting a parity of the string to correspond to the selected parity, and sending the reply with the parity-adjusted string.

According to some embodiments, the string may be a random number, a pseudorandom number, an algorithmically-generated value, a cryptographic value, and a content of an IC memory. Adjusting the parity of the string may include adjusting a parity bit, a checksum, a cyclic-redundancy-check, an error-detection code, and/or an error-correction code in the reply. Adjusting the parity of the string may include adding one or more bits to the string such that the parity of the string corresponds to the selected parity and/or adjusting one or more bits of the generated string such that the parity of the string corresponds to the selected parity. The method may further include receiving an encoding-switch command instructing the IC to begin generating non-parity-adjusted strings, and in response to receiving the encoding-switch command generate a string for inclusion in a reply to a subsequent inventorying command and send the reply with the string without adjusting a parity of the string to correspond to the selected parity.

According to other examples, a method for an RFID IC coupled to an antenna to operate in one of multiple inventorying sessions is provided. The method may include receiving an inventorying command specifying one of the inventorying sessions, selecting an encoding scheme based on the specified session, generating a reply to the inventorying command by generating a string for inclusion in the reply and adjusting the string according to the selected encoding scheme, and sending the reply with the encoding-adjusted string.

According to further examples, an RFID IC configured to be coupled to an antenna is provided. The IC may include a transceiver configured to communicate with RFID readers and a processor coupled to the transceiver. The processor may be configured to receive, via the transceiver, an inventorying command specifying one of multiple inventorying sessions, select an encoding scheme based on the specified session, generate a string for inclusion in a reply to the inventorying command, adjust the string according to the selected encoding scheme, and send the reply with the encoding-adjusted string.

According to some embodiments, the string may be a random number, a pseudorandom number, an algorithmically-generated value, a cryptographic value, and a content of an IC memory. The encoding scheme may be a parity encoding scheme, a checksum encoding scheme, a cyclic-redundancy-check encoding scheme, an error-detection encoding scheme, or an error-correction encoding scheme. The method may further include, or the processor may be further configured to perform, selecting the encoding scheme by selecting a first encoding scheme if the specified session is a first session or a third session, and selecting a second encoding scheme if the specified session is a second session or a fourth session. The first encoding scheme may have an odd parity and the second encoding scheme may have an even parity. The encoding scheme(s) may involve including a session indicator in the encoding-adjusted string. The method may further include, or the processor may be further configured to perform, adjusting the string according to the selected encoding scheme by adding a cyclic-redundancy-check and/or at least one bit to the string based on the selected encoding scheme and/or adjusting one or more bits of the generated string based on the selected encoding scheme. The method may further include, or the processor may be further configured to perform, receiving an encoding-switch command instructing the IC to begin generating non-encoding-adjusted strings, and in response to receiving the encoding-switch command generate a string for inclusion in a reply to a subsequent inventorying command and send the reply with the string without adjusting the string according to the selected encoding scheme.

According to yet further examples, RFID readers and systems configured to use session-dependent replies and methods for such readers and systems to use session-dependent replies are provided, as described above.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method to determine whether a tag reply is intended for a reader, the method comprising:

transmitting an inventorying command specifying a parameter having a first value;

receiving a tag reply;

determining whether the tag reply is generated based on the first value and therefore is responsive to the reader or is not generated based on the first value and therefore is responsive to another reader;

determining that the tag reply is generated based on the first value; and in response, determining that the tag reply is responsive to the reader.

2. The method of claim 1, further comprising:

upon determining that the tag reply is responsive to the reader, one or more of:

causing the reader to acknowledge a tag that sent the tag reply, or causing a tag that sent the tag reply to modify a flag corresponding to the parameter.

3. The method of claim 1, further comprising:

receiving a second tag reply;

determining whether the second tag reply is generated based on the first value and therefore is responsive to the reader or is not generated based on the first value and therefore may be responsive to another reader; and determining that the second tag reply is not generated based on the first value.

4. The method of claim 1, wherein:

the first value is associated with at least one of a first parity or a first encoding; and determining that the tag reply is generated based on the first value comprises determining that at least a portion of the tag reply at least one of has the first parity or is encoded according to the first encoding.

5. The method of claim 4, wherein the at least a portion of the tag reply is one of an algorithmically generated value, a cryptographic value, or a content of a tag memory.

6. The method of claim 4, wherein if the first value is associated with a first parity, the method further comprises:

determining a parity of a reply portion based on the value of at least one of a parity bit, a checksum, a cyclic-redundancy-check, an error-detection code, or an error-correction code.

7. The method of claim 1, further comprising instructing tags to enable generating replies based on the parameter by:

transmitting an encoding-switch command prior to the inventorying command, or transmitting the inventorying command.

8. The method of claim 1, wherein determining whether the tag reply is generated based on the first value comprises determining whether a string in the tag reply is generated based on the first value.

9. A method to determine whether a tag reply is intended for a reader, the method comprising:

transmitting an inventorying command specifying a parameter having a first value;

receiving a tag reply;

determining whether the tag reply is generated based on the first value, wherein the tag reply is responsive to the reader if it is generated based on the first value and the tag reply is responsive to another reader if it is generated based on a second value; and determining that the tag reply is generated based on the first value and therefore is responsive to the reader.

10. The method of claim 9, further comprising:

upon determining that the tag reply is responsive to the reader, one or more of:

causing the reader to acknowledge a tag that sent the tag reply, or causing a tag that sent the tag reply to modify a flag corresponding to the parameter.

11. The method of claim 9, further comprising:

receiving a second tag reply;

determining whether the second tag reply is generated based on the first value, wherein the second tag reply is responsive to the reader if it is generated based on the first value and the second tag reply is responsive to another reader if it is generated based on the second value; and determining that the second tag reply is not generated based on the first value and therefore may be responsive to another reader.

12. The method of claim 9, wherein:

the first value is associated with at least one of a first parity or a first encoding; and determining that the tag reply is generated based on the first value comprises determining that at least a portion of the tag reply at least one of has the first parity or is encoded according to the first encoding.

13. The method of claim 9, further comprising instructing tags to enable generating replies based on the parameter by:

transmitting an encoding-switch command prior to the inventorying command, or transmitting the inventorying command.

14. The method of claim 9, wherein determining whether the tag reply is generated based on the first value comprises determining whether a string in the tag reply is generated based on the first value.

15. A Radio Frequency Identification (RFID) reader system comprising:

a transceiver configured to communicate with tags; and a processing block coupled to the transceiver and configured to:

transmit an inventorying command specifying a parameter having a first value;

receive a tag reply;

determine whether the tag reply is generated based on the first value and therefore is responsive to the reader or is not generated based on the first value and therefore is responsive to another reader;

determine that the tag reply is generated based on the first value; and in response, determine that the tag reply is responsive to the reader.

16. The RFID reader system of claim 15, wherein the processing block is further configured to, upon determining that the tag reply is responsive to the reader:

cause the reader to acknowledge a tag that sent the tag reply, or cause a tag that sent the tag reply to invert a flag corresponding to the parameter.

17. The RFID reader system of claim 15, wherein the processing block is further configured to:

receive a second tag reply;

determine whether the second tag reply is generated based on the first value and therefore is responsive to the reader or is not generated based on the first value and therefore may be responsive to another reader;

determine that the second tag reply is not generated based on the first value.

18. The RFID reader system of claim 15, wherein:

the first value is associated with at least one of a first parity or a first encoding; and the processing block is configured to determine that the tag reply is generated based on the first value by determining that at least a portion of the tag reply at least one of has the first parity or is encoded according to the first encoding.

19. The RFID reader system of claim 15, wherein the processing block is further configured to instruct tags to enable generating replies based on the parameter by transmitting, via the transceiver, one of:

an encoding-switch command prior to the inventorying command, or the inventorying command.

20. The RFID reader system of claim 15, wherein the processing block is configured to determine that the tag reply is generated based on the first value by determining whether a string in the tag reply is generated based on the first value.

* * * * *